United States Patent [19]

Tajima

[11] Patent Number: 4,876,706
[45] Date of Patent: Oct. 24, 1989

[54] SHEET FILM PACKAGE

[75] Inventor: Kenji Tajima, Kanagawa, Japan

[73] Assignee: Fuji Photo Film Co., Ltd., Kanagawa, Japan

[21] Appl. No.: 98,824

[22] Filed: Sep. 21, 1987

[30] Foreign Application Priority Data

Sep. 19, 1986 [JP] Japan .................... 61-221593

[51] Int. Cl.⁴ .......................................... G03B 42/04
[52] U.S. Cl. .................................... 378/174; 378/182; 354/277
[58] Field of Search ................ 378/174, 182; 354/276, 354/277; 206/455

[56] References Cited

U.S. PATENT DOCUMENTS 4,426,724  1/1984  Cutter ........................... 378/182
4,727,391  2/1988  Tajima et al. ................... 378/182

FOREIGN PATENT DOCUMENTS 2513673  10/1976  Fed. Rep. of Germany ...... 378/174

Primary Examiner—Carolyn E. Fields
Assistant Examiner—David P. Porta
Attorney, Agent, or Firm—Sughrue, Mion, Zinn, Macpeak & Seas

[57] ABSTRACT

A sheet film package includes a tray for storing sheet films, a first cover member for covering a film access opening defined in the tray, and a second cover member joined to the first cover member inwardly of an area where the first cover member starts to be peeled off. After the sheet film package has been loaded in a device such as an image recorder, the first cover member is cut off at the peeling-starting area by a cutter mechanism in the device, and the second cover member is pulled to peel the first cover member off the tray from the cut-off peeling-starting area, so that the film-access opening can reliably be opened in a bright room.

5 Claims, 6 Drawing Sheets

SHEET FILM PACKAGE

BACKGROUND OF THE INVENTION

The present invention relates generally to a sheet film package, and more particularly to a sheet film package comprising a tray for storing a plurality of sheet films therein and a light-shielding cover peelably attached to the tray and closing a film access opening, the cover being easily and reliably peelable off the tray in a bright room after the tray with sheet films stored therein has been loaded in a device such as an image recorder.

X-ray photographing devices are widely used in the medical field for recording radiation images of objects such as human bodies on X-ray films by applying X rays to the objects for medical diagnosis. For photographing an object on such an X-ray film, it has been customary to load the X-ray film into an X-ray photographing device under a light-shielded environment and expose the emulsion layer of the film directly to an X ray having passed through the object for recording the image of the object thereon.

There has recently been developed and widely used, particularly in the medical field, a radiation image recording and reproducing system for producing the radiation-transmitted image of an object using a stimulable phosphor material capable of emitting light upon exposure to stimulating rays. When a certain phosphor is exposed to a radiation such as X-rays, $\alpha$-rays, $\beta$-rays, $\gamma$-rays, cathode rays, or ultraviolet rays, the phosphor stores a part of the energy of the radiation. When the phosphor exposed to the radiation is subsequently exposed to stimulating rays such as visible light, the phosphor emits light in proportion to the stored energy of the radiation. The phosphor exhibiting such a property is referred to as a "stimulable phosphor".

In the radiation image recording and reproducing system employing such a stimulable phosphor, the radiation image information of an object such as a human body is stored in a sheet having a layer of stimulable phosphor, and then the stimulable phosphor sheet is scanned with stimulating rays such as a laser beam to cause the stimulable phosphor sheet to emit light representative of the radiation image. The emitted light is then photoelectrically detected to produce an image information signal that is electrically processed for generating image information which is recorded as a visible image on a recording medium such as a photosensitive material or displayed as a visible image on a CRT or the like.

The visible image thus produced may be recorded on a recording medium by an image recorder such as an image output laser printer, for example. In the image output laser printer, photographic films stored as a recording material in a magazine are loaded, and taken out one by one by a sheet delivery device such as a suction disk or cup. thereafter, the film is exposed to a laser beam modulated by an electric signal produced from the stimulable phosphor sheet for recording an image on the film. The exposed film is then transferred into an automatic developing device and processed thereby to develop the image. The film is thereafter stored in a prescribed place or used for medical diagnosis when required.

When loading the films into the image output laser printer, they must not be exposed to extraneous light. Therefore, it is general practice to load the films into the image output laser printer in a dark room, but the efficiency of such a loading process is low. There is a strong demand for the loading of films under bright conditions such as in an ordinary bright room, and various methods have been proposed for loading films in bright environments. One such method is disclosed in Japanese Laid-Open Utility Model Publication No. 56(1981)-5141.

FIG. 1a illustrates in cross section a conventional sheet film package 1 to be loaded into an image recorder. The film package 1 includes a light-shielded or sunproof container 2 in the form of a box having an opening 2a. The light-shielded container 2 contains a pluraltiy of unexposed films F protected by cardboard 3. A flexible light-shielding member 4 is applied over the opening 2a in light-shielding relation to protect the unexposed films F from exposure to extranous light. One end of the flexible light-shielding member 4 is curved upwardly and has an engagement hole 4a defined near its edge.

The film package 1 of the above construction is positioned by a storage unit 6 housed in a magazine 5 as shown in FIG. 1b. The magazine 5 has a shutter 7 having an engagement pin 8 mounted on one end thereof. After the engagement pin 8 has engaged in the hole 4a of the flexible light-shielding member 4, the magazine 5 is loaded into an image recorder (not shown), and the other end of the shutter 7 is manually pulled out of the magazine 5. As a result, the flexible light-shielding member 4 is peeled off the container 2 by the pin 8 engaging the hole 4a, and the opening 2a is opened in the image recorder. The uppermost unexposed film F is then attracted by a suction device or cup 9 and delivered through the opening 2a into a given photographing position.

With the illustrated conventional device, however, the dedicated magazine 5 must be used to store the film package 1. This magazine must be of a rugged construction capable of withstanding stresses due to repeated attachment and removal thereof, and hence is considerably heavy. Therefore, it is labor some for the operator to load and unload the magazine. The magazine is also considerably expensive since it has a shutter mechanism. Where various films of different sizes are to be employed, there must be used as many dedicated magazines as the number of those different film sizes, and the cost of manufacture is so high that they are economically infeasible in reality.

In order to load the films into the X-ray photographing device, it is necessary to attach the shutter to the end of the film package or the light-shielding member, and pull out the shutter after the magazine has been placed into the device. As a consequence, the film loading process of the above nature is tedious and considerably time-consuming.

In view of the aforesaid difficulties, there has been proposed a sheet film package capable of loading films into an image recorder under bright conditions without using a dedicated magazine, as disclosed in Japanese Patent Application No. 61(1986)-50038. The proposed sheet film package has a tray for storing a stack of films and a flexible cover member peelably attached to the tray. The cover member is bent at one end thereof. The length of the cover member is selected such that when loading the tray into the image recorder, the end of the cover member remains exposed out of the image recorder.

In use, the tray is loaded into the image recorder in a bright room, and then the cover member is peeled off the tray under light-shielded conditions, thus defining a film access opening in the tray. The sheet film package is simple in construction, lightweight, and inexpensive, and any of dedicated magazines which have been in conventional use are no longer necessary.

SUMMARY OF THE INVENTION

It is a major object of the present invention to provide a sheet film package including a tray for storing sheet films, a first cover member for covering a film access opening defined in the tray, and a second cover member joined to the first cover member inwardly of an area where the first cover member starts to be peeled off, the arrangement being such that after the sheet film package has been loaded in a device such as an image recorder, the first cover member is cut off at the peeling-starting area by a cutter mechanism in the device, and the second cover member is pulled to peel the first cover member off the tray from the cut-off peeling-starting area, so that the film-access opening can reliably be opened in a bright room.

Another object of the present invention is to provide a sheet film package comprising a tray for storing a stack of sheet films, the tray having a film access opening, a flexible first cover member peelably joined at a portion to the tray for closing the film access opening to hold the sheet films under light-shielded conditions, the first cover member having a peeling-starting area where the first cover member starts to be peeled off, the peeling-starting area being unjoined to the tray and located inwardly of the joined portion thereof, and a second cover member joined to the first cover member inwardly of the peeling-starting area, the arrangement being such that after the sheet film package has been loaded into a device having a cutter mechanism, the peeling-starting area is cut off by the cutter mechanism, and the second cover member is pulled out of the device to peel the first cover member off the tray from the cut-off peeling-starting area.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1A:
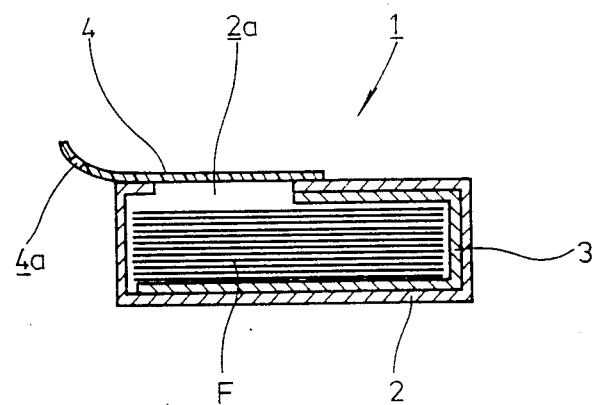
FIGS. 1a and 1b are cross-sectional views of a conventional film package.
Figure 1B:
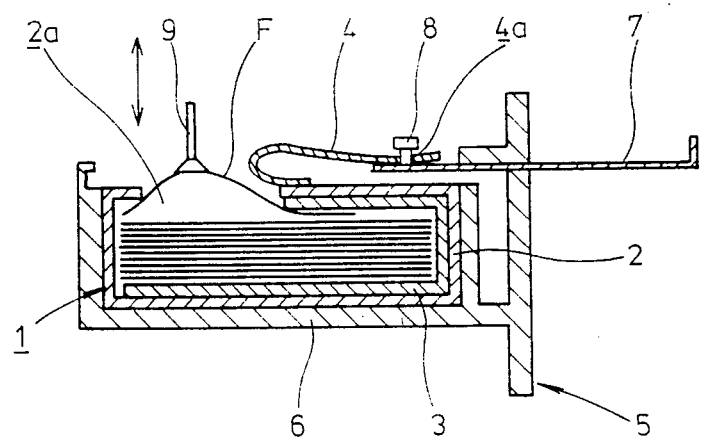
Figure 2:
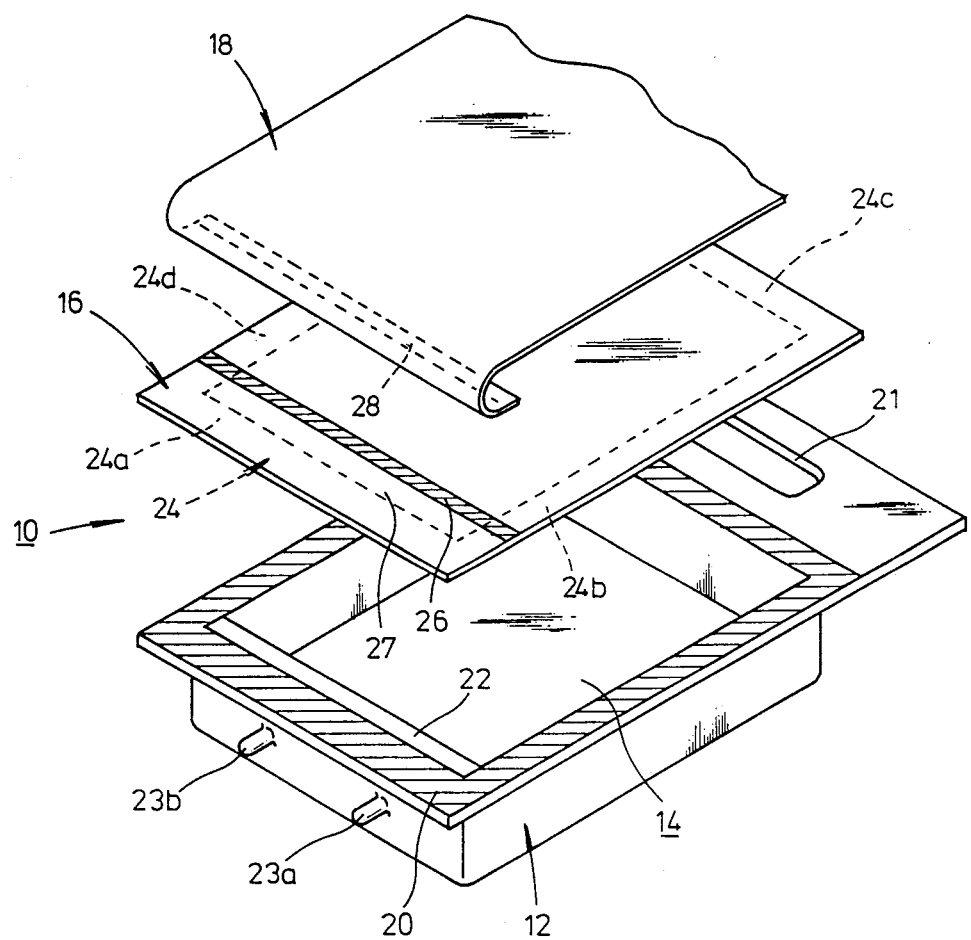
FIG. 2 is a perspective view, partly omitted from illustration, of a sheet film package according to the present invention.

As shown in FIG. 2, a sheet film package 10 according to the present invention basically comprises a tray 12 for storing a stack of sheet films F therein, a flexible light-shielding first cover member 16 peelably attached to the tray 12 to cover a film access opening 14 defined in the tray 12 for holding the films F under light-shielded conditions, and a second cover member 18 joined to the first cover member 16 near its peeling-starting area for pulling the first cover member 16.

The tray 12 is in the form of a rectangular casing with the film access opening 14 and has a joining zone 20 (shown hatched) extending around the film access opening 14 for joining the first cover member 16 by fusing, for example. The tray 12 has a grip 21 on one end thereof for the user to grip the sheet film package 10, and an engaging ledge 22 projecting from the other end thereof into the film access opening 14, the engaging ledge 22 being an unjoined zone separate from the joining zone 20. Two spaced pins 23a, 23b project from the side wall of the tray 12 near the engaging ledge 22 in an outward direction away from the film-access opening 14.

The first cover member 16 has on its lower surface a joining zone 24, as indicated by the broken lines, extending along the peripheral edges thereof and composed of four securing portions 24a through 24d. The first cover member 16 has on its upper surface a joining zone 26 to which the second cover member 18 is fixed. The joining zone 26 has a prescribed width and extends in a direction transverse to the direction in which the first cover member 16 is peeled off the tray 12. The joining zone 26 is positioned inwardly of the securing portion 24a. The securing portion 24a and the joining zone 26 define therebetween the peeling-starting area, denoted at 27.

Figure 3:
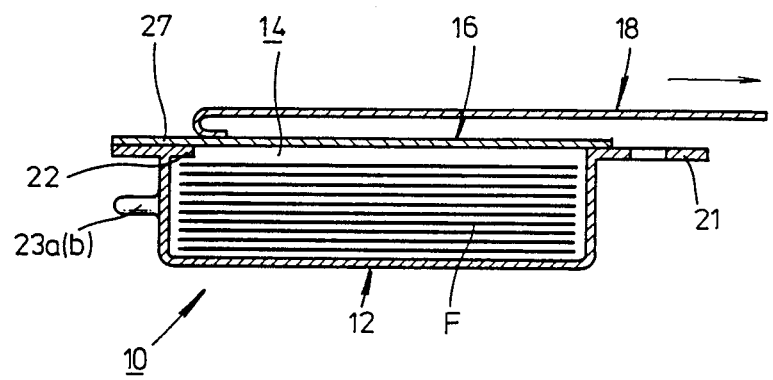
FIG. 3 is a vertical cross-sectional view of the sheet film package shown in FIG. 2.

The second cover member 18 is made of a flexible material and has a joining zone 28 on one end thereof corresponding to the joining zone 26 of the first cover member 16. The second cover member 18 is folded back from the joining zone 28 to extend over the first cover member 16 toward the grip 21 of the tray 12. The free end of the second cover member 18 extends outwardly beyond the grip 21 (see FIG. 3).

Figure 4:
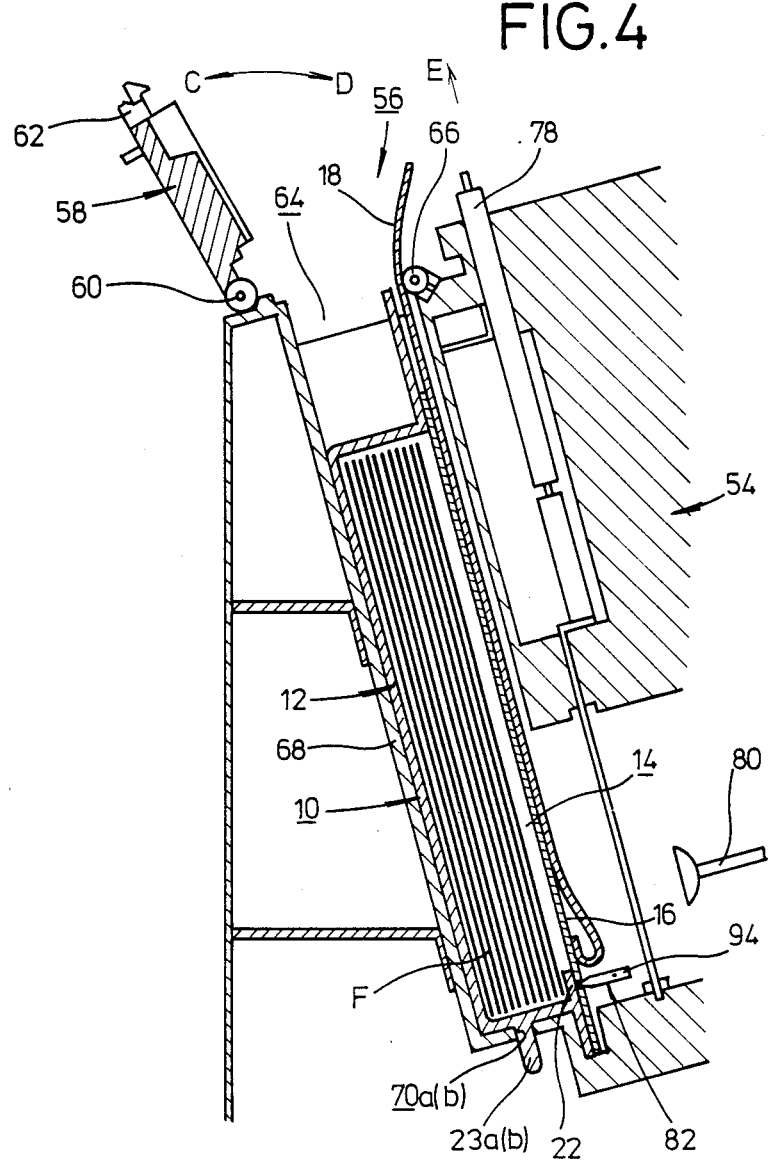
FIGS. 4 and 5 are fragmentary vertical cross-sectional views of the sheet film package and a device for loading the same therein.
Figure 5:
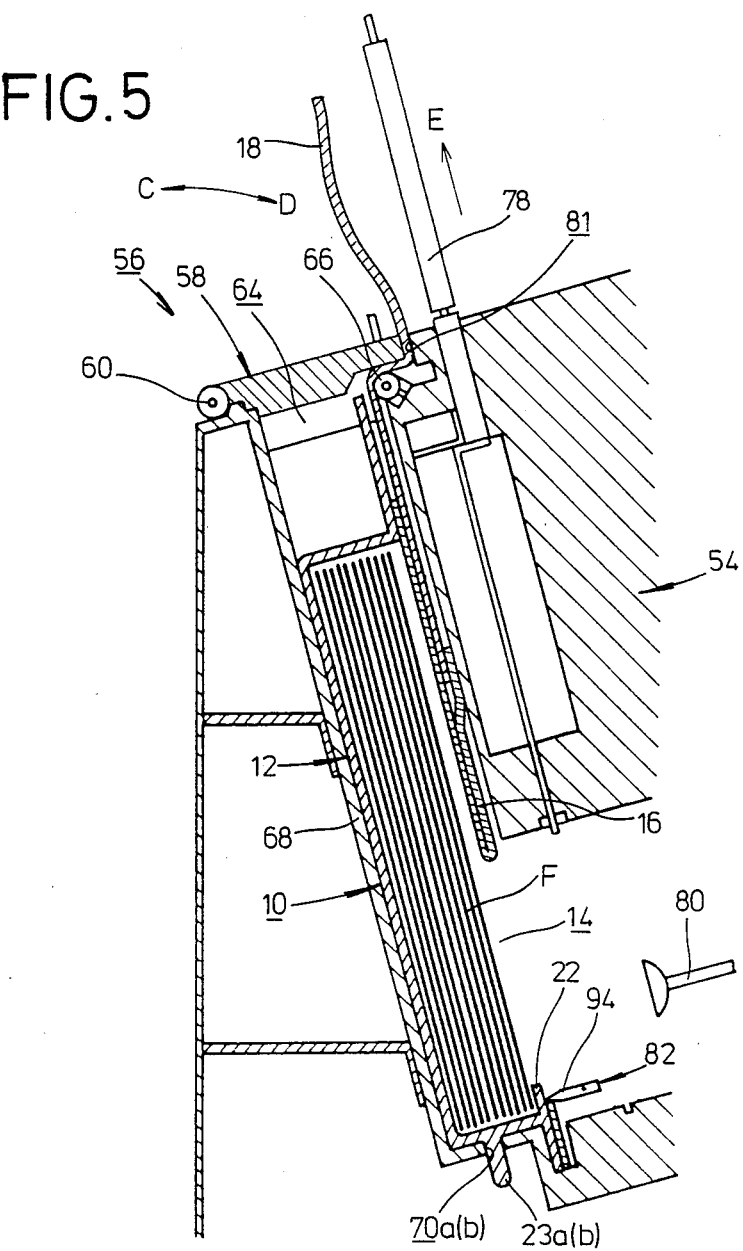

The sheet film package 10 thus constructed will be loaded into an image recorder as shown in FIGS. 4 and 5.

The image recorder has a main body or housing 54 accommodating therein a package loading device 56. The package loading device 56 includes a lid 58 pivotally mounted at one end to the housing 54 by means of a pin 60, the lid 58 having a lock member 62 on the other end. The lock member 62 is displaceable under the resiliency of a spring (not shown), and locks the lid 58 on the housing 54 when the lock member 62 engages the housing 54. The package loading device 56 has a loading slot 64 which can be opened and closed by the lid 58 and in which there projects a roller 66 that is displaceable with respect to the housing 54 under the resiliency of a spring (not shown).

The sheet film package 10 is placed on a receiver base 68 extending obliquely with respect to the vertical direction and has a bottom end of a bent shape complementary to the sheet film package 10. The bottom end of the receiver base 68 has holes 70a, 70b for receiving therein the pins 23a, 23b of the sheet film package 10 to position the sheet film package 10 in the package loading device 56.

The housing 54 also houses a shutter member 78 for opening and closing a chamber which is defined in the housing 54 and accommodates a sheet delivery mechanism 80 including a suction cup. Between the shutter member 78 and the sheet film package 10, there is disposed a cutter mechanism 82 for cutting off the first cover member 16 of the sheet film package 10.

Figure 6:
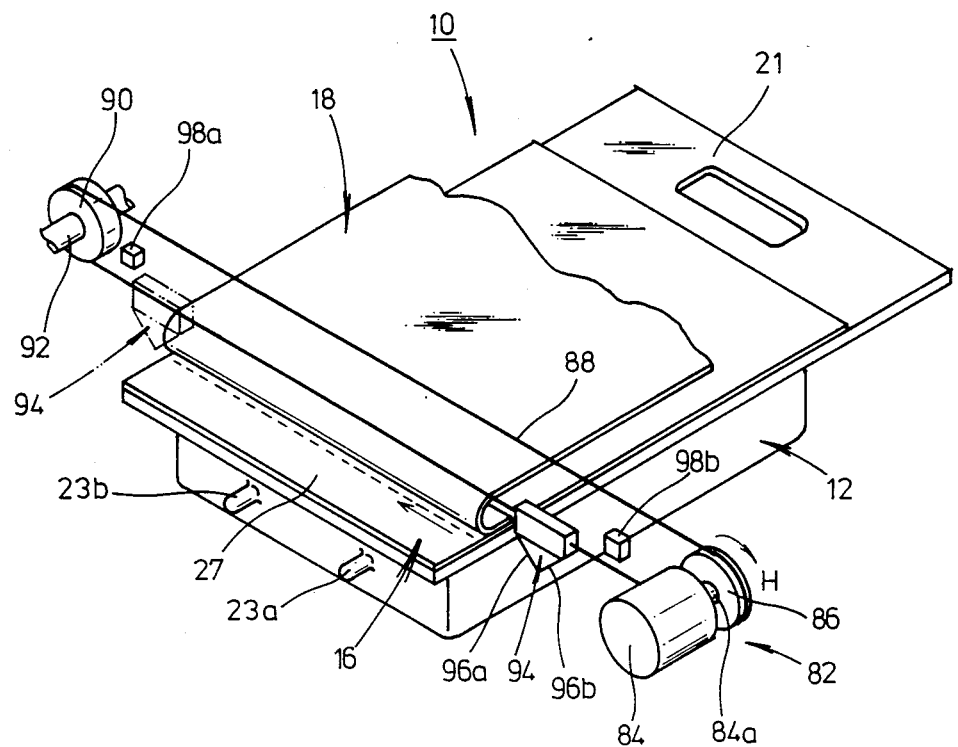
FIG. 6 is a fragmentary perspective view of a cutter mechanism in the device shown in FIGS. 4 and 5.

In the illustrated embodiment, the cutter mechanism 82 is of a structure as shown in FIG. 6. The cutter mechanism 82 has a rotative driver source 84 having a rotatable drive shaft 84a on which a first sprocket 86 is supported. A chain 88 is trained around the first sprocket 86 and a second sprocket 90 which is rotatably supported in the housing 54 by a shaft 92. The first and second sprockets 86, 90 are spaced apart from each other by a distance greater than the width or transverse dimension of the sheet film package 10 A cutter 94 is attached to the chain 88 and has first and second cutter blades 96a, 96b. The cutter 94 is reciprocally movable by the chain 88 in a direction normal to the direction in which the first cover member 16 will be peeled off the tray 12. The position of the cutter 94 is selected in advance such that it can reliably cut off the peeling-starting area 27 of the first cover member 16 on the engaging ledge 22 of the tray 12. Two limit switches 98a, 98b are disposed near the first and second sprockets 86, 90, respectively, for detecting the position of the cutter 94.

A process of loading the sheet film package 10 into the image recorder will be described below.

As shown in FIG. 4, the lid 58 is swung in the direction of the arrow C to open the loading slot 64, and the sheet film package 10 is inserted through the loading slot 64 onto the receiver base 68 until the pins 23a, 23b of the sheet film package 10 are fitted respectively into the holes 70a, 70b of the receiver base 68, whereupon the sheet film package 10 is fixedly positioned on the receiver base 68.

The sheet film package 10 contains a stack of sheet films F therein. With the film access opening 14 closed by the first cover member 16, the free end of the second cover member 18 extends out of the loading slot 64 (FIG. 4). The lid 58 is then turned in the direction of the arrow D to close the loading slot 64, and locked to the housing 54 by the lock member 62. At this time, the second cover member 18 is sandwiched between the roller 66 and the inner surface of the lid 58, with the free end of the second cover member 18 extending out through a gap 81 defined between the lid 58 and the housing 54 (FIG. 5).

Then, the rotative drive source 84 of the cutter mechanism 82 is actuated to rotate the drive shaft 84a in the direction of the arrow H (FIG. 6), the first sprocket 86 is also rotated in the direction of the arrow H. Thus, the cutter 94 is displaced in the direction of the arrow by the chain 88 trained around the first and second sprockets 86, 90. The cutter blade 96a of the cutter 94 cuts off the unjoined peeling-starting area 27 of the first cover member 16 on the engaging ledge 22 of the tray 12 in the direction normal to the direction in which the first cover member 16 will be peeled off the tray 12. When the cutter 94 and-dash lines in FIG. 6, the rotative drive source 84 is de-energized.

The exposed end of the second cover member 18 is then pulled out in the direction of the arrow E (FIG. 5) to draw the second cover member 18 as it is sandwiched between the roller 66 and the lid 58. The first cover member 16 to which the second cover member 18 is secured is then peeled off the tray 12 over a prescribed length. Since the peeling-starting area 27 of the first cover member 16 has been cut off by the cutter mechanism 82, the first cover member 16 can easily and reliably be peeled off the tray 12 by pulling the second cover member 18 in the direction of the arrow E under a relatively small tensile force.

After the film access opening 14 of the tray 12 has been opened sufficiently to allow the sheet films F to be taken out of the tray 2, the shutter member 78 is pulled out in the direction of the arrow E. The sheet films F stored in the tray 2 are taken out one by one by the sheet delivery mechanism 80, which then feeds them to an image recording unit (not shown).

After all of the sheet films F have been taken out of the tray 2, the sheet delivery mechanism 80 is inactivated. Then, the shutter member 78 is moved back into the housing 54 in the direction opposite to the direction of the arrow E, and the lock member 62 is released. The lid 58 is swung in the direction of the arrow C to allow the empty package 10 to be removed from the package loading device 56. If necessary, a new sheet film package 10 storing a desired number of sheet films F is placed on the receiver base 68, and the sheet films F will be supplied into the housing 54 in the manner described above. At this time, the cutter 94 of the cutter mechanism 82 is in engagement with the limit switch 98a as indicated by the two-dot-and-dash lines in FIG. 6. The rotative drive source 84 is reversed in the direction opposite to the direction of the arrow H, whereupon the sprocket 86 is rotated by the drive shaft 84a in the direction opposite to the direction of the arrow H. Therefore, the cutter 94 is moved by the chain 88 to war the limit switch 98b while cutting off the first cover member 16 of the new sheet film package 10 with the cutter blade 96b. When the cutter 94 engages the limit switch 98b, the rotative drive source 84 is de-energized, and the cutter 94 is stopped and readied for cutting off the first cover member 16 of a new sheet film package 10.

With the sheet film package of present invention, as described above, a first cover member is peelably. attached to a tray storing a stack of sheet films in covering relation to a film access opening defined in the tray, and a second cover member is secured to the first cover member at a position inwardly of a peeling-starting area of the first cover member. After the sheet film package is loaded in an image recorder and the peeling-staring area of the first cover is cut off by a cutter mechanism in the image recorder, the second cover is pulled to peel the first cover member off the tray easily under a relatively small tensile force. Accordingly, the film access opening can reliably be opened in the image recorder.

Although a certain preferred embodiment has been shown and described, it should be understood that many changes and modifications may be made therein without departing from the scope of the appended claims.

What is claimed is:

1. A sheet film package comprising:
   a tray for storing a stack of sheet films, said tray having a film access opening;
   a flexible first cover member peelably joined at a portion to said tray for closing said film access opening to hold said sheet films under light-shielded conditions, said first cover member having a peeling-starting area where said first cover member starts to be peeled off, said peeling-starting area being unjoined to said tray and located inwardly of the joined portion thereof, wherein said first cover member includes a cut-off area provided between an edge portion of the tray and said peeling-starting area; and a second cover member joined to said first cover member inwardly of said peeling-starting area.

2. A sheet film package according to claim 1, wherein one end of said second cover member is joined to said cover member inwardly of said peeling-starting area, said second cover member being folded back and having a free end extending outwardly beyond an end of said tray.

3. A sheet film package according to claim 1 or 2, wherein said tray has on an upper surface thereof a joining zone to which said first cover member is joined to said tray and an unjoined zone, the arrangement being such that said peeling-starting area is cut off by a cutter mechanism on said unjoined zone.

4. A sheet film package according to claim 3, wherein said unjoined zone of said tray extends into said film access opening.

5. A sheet film package according to claim 4, wherein said tray has a grip on one end thereof and at least one projection on the other end thereof for positioning said tray in said device.

* * * * *